US012614436B2

(12) United States Patent
Brinkschulte et al.

(10) Patent No.: US 12,614,436 B2
(45) Date of Patent: Apr. 28, 2026

(54) LoRaWAN MESH GATEWAY NETWORK AND METHOD FOR LOCATING A FOREST FIRE

(71) Applicant: DRYAD NETWORKS GMBH, Eberswalde (DE)

(72) Inventors: Carsten Brinkschulte, Berlin (DE); Daniel Hollos, Berlin (DE)

( * ) Notice: Subject to any disclaimer, the term of this patent is extended or adjusted under 35 U.S.C. 154(b) by 0 days.

(21) Appl. No.: 18/682,439

(22) PCT Filed: Aug. 8, 2022

(86) PCT No.: PCT/EP2022/072222
§ 371 (c)(1),
(2) Date: Feb. 9, 2024

(87) PCT Pub. No.: WO2023/016981
PCT Pub. Date: Feb. 16, 2023

(65) Prior Publication Data
US 2024/0346899 A1      Oct. 17, 2024

(30) Foreign Application Priority Data
Aug. 9, 2021      (DE) ..................... 10 2021 120 703.7

(51) Int. Cl.
G08B 17/00      (2006.01)
H04W 88/16      (2009.01)

(52) U.S. Cl.
CPC ........... G08B 17/005 (2013.01); H04W 88/16 (2013.01)

(58) Field of Classification Search
CPC ...... G08B 17/005; H04W 88/16; H04W 4/02; H04W 4/38
See application file for complete search history.

(56) References Cited

U.S. PATENT DOCUMENTS

| | | | |
|---|---|---|---|
| 7,791,415 | B2 | 9/2010 | Hornbuckle |
| 2008/0309502 | A1 | 12/2008 | Boccia |
| 2017/0230907 | A1 | 8/2017 | Rose |
| 2020/0242916 | A1 | 7/2020 | Krstanovic |

(Continued)

FOREIGN PATENT DOCUMENTS

| | | |
|---|---|---|
| CN | 112750267 | 5/2021 |
| WO | 2012107927 | 8/2012 |

OTHER PUBLICATIONS

Norm IEEE Std 802.11s-2011. Standard for Information Technology—Telecommunications and information exchange between systems—Local and metropolitan area networks—Specific requirements Part 11: Wireless LAN Medium Access Control (MAC) and Physical Layer (PHY) specifications. S.1-372.—ISBN 978-0-7381-6731-2 (E). DOI:10.1109/IEEESTD.2011.6018236. URL: https://ieeexplore.ieee.org/document/6018236.

*Primary Examiner* — Michael E Teitelbaum
(74) *Attorney, Agent, or Firm* — JMB DAVIS BEN DAVID

(57) ABSTRACT

The invention relates to a LoRaWAN mesh gateway network having a network server, a plurality of first gateways, a second gateway and a plurality of terminal devices, wherein a terminal device comprises a sensor unit, a logic unit, a communication unit and a timekeeper, wherein the logic unit is intended for this purpose and suitable for evaluating the signals recorded by the sensor unit and the time measured by the timekeeper, as well as to a method for locating a forest fire.

13 Claims, 8 Drawing Sheets

(56) References Cited

U.S. PATENT DOCUMENTS

Figure 1A:
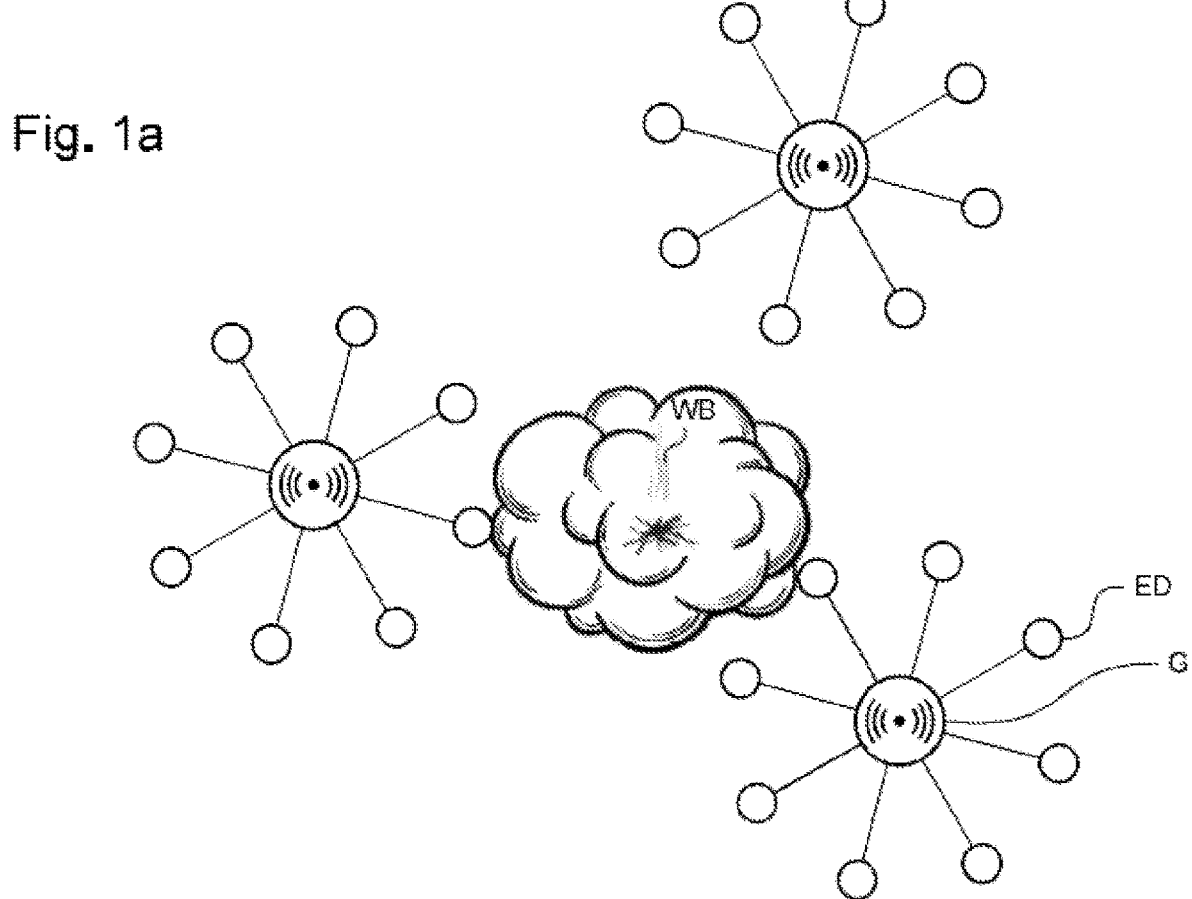

| | | |
|---|---|---|
| 2020/0348446 A1 | 11/2020 | Tremsin |
| 2021/0110691 A1* | 4/2021 | Heinonen ............ G08B 29/188 |
| 2021/0200206 A1* | 7/2021 | Diwakar ............. G05D 1/0055 |

* cited by examiner

Fig. 2

LoRaWAN MESH GATEWAY NETWORK AND METHOD FOR LOCATING A FOREST FIRE

CROSS-REFERENCE TO RELATED APPLICATIONS

This is the U.S. National Stage of International Patent Application No. PCT/EP2022/072222 filed Aug. 8, 2022, which claims priority to German Patent Application No. 10 2021 120 703.7 filed Aug. 9, 2021.

The invention relates to a LoRaWAN mesh gateway network with a network server, a plurality of first gateways, a second gateway and a plurality of terminal devices, wherein a terminal device has a sensor unit, a logic unit, a communication unit and a timekeeper, wherein the logic unit is intended for this purpose and suitable for evaluating the signals recorded by the sensor unit and the time measured by the timekeeper, as well as to a method for locating a forest fire.

The LoRaWAN network architecture is typically built in a star topology, in which gateways act as a transparent bridge, forwarding messages between terminal devices and a central network server, terminal devices and backend. The gateways are connected to a corresponding network server via a standard IP connection, while the terminal devices use single-hop wireless communication (LoRa) to one or more gateways. Endpoint communications are typically bi-directional and also support operation of, for example, multi-cast over-the-air software updates or other mass message distribution capabilities to reduce transmission times over air communications. The communication between gateways and terminal devices is distributed over different data rates and frequency channels, with the selection of the data rate representing a compromise between message duration and communication range. Thanks to the so-called spread spectrum technology, communication at different data rates does not interfere with each other and creates a series of virtual channels that increase the capacity of the respective gateways. LoRaWAN data rates range from 0.3 kbps up to 50 kbps. To maximize the battery life of the entire network capacity and terminal devices, the LoRaWAN network server manages the HF output and data rate for all terminal devices individually using an adaptive data rate scheme. While LoRaWAN defines the communication protocol and system rights for the network, the LoRa layer enables a long-range wireless communication connection. LoRa involves very low power wireless communication. LoRaWAN refers to a network protocol using LoRa chips for communication and is based on a base station that can monitor eight frequencies with multiple spreading factors with almost 42 channels. With its star topology (LoRaWAN) and energy-saving signal transmission technology (LoRa), the LoRaWAN network technology is specifically designed for the energy-efficient and secure networking of terminal devices in the Internet of Things and is particularly suitable for outdoor use.

This Internet of Things places various demands on the network technology used. The architecture is designed for thousands of terminal devices, which can be located far away, in populated or unpopulated areas and in places that are difficult to access, and includes sensors that monitor water flow or irrigation systems, as well as consumption meters and much more. The requirements of the outdoor application must safely support battery-operated terminal devices and at the same time greatly simplify installation and maintenance so that only radio operation is considered.

Strict power consumption requirements for terminal devices must also be taken into account, as they have to be operated with only one battery for several years.

LoRa has particularly low energy consumption and is based on chirp frequency spread modulation according to U.S. Pat. No. 7,791,415 B2. Licenses for use are granted by Semtech. LoRa uses license- and permit-free radio frequencies in the range below 1 GHZ, such as 433 MHz and 868 MHz in Europe or 915 MHz in Australia and North America, enabling a range of more than 10 kilometers in rural areas with very low energy consumption. The LoRa technology consists of the LoRa physical protocol on the one hand and the LoRaWAN protocol on the other hand, which is defined and managed as the upper layer of the network by the industrial consortium "LoRa Alliance." LoRaWAN networks implement a star-shaped architecture using gateway message packets between the terminal devices and the central network server. The gateways (also called concentrators or base stations) are connected to the network server via the standard Internet protocol, while the terminal devices communicate with the respective gateway via radio via LoRa (chirp frequency spread modulation) or FSK (frequency modulation). The radio connection is therefore a single-hop network in which the terminal devices communicate directly with one or more gateways, which then forward the data traffic to the Internet. Conversely, data traffic from the network server to a terminal device is only routed via a single gateway. Data communication basically works in both directions, but data traffic from the terminal device to the network server is the typical application and the predominant operating mode. By bridging larger distances with very low energy consumption, LoRaWAN is particularly suitable for IoT applications outside of settlements, such as automatic irrigation systems or the measurement of environmental parameters in agriculture.

On the physical level, LoRaWAN, like other wireless protocols for IoT applications, uses spread spectrum modulation. It differs by using an adaptive technique based on chirp signals, as opposed to traditional DSSS (Direct Sequence Scatter Spectrum Signaling). The chirp signals offer a compromise between reception sensitivity and maximum data rate. A chirp signal is a signal that varies in frequency over time. LoRaWAN technology can be implemented cost-effectively because it does not rely on a precise clock source. LoRa's range extends up to 40 kilometers in rural areas. In the city, the advantage is good building penetration, as cellars can also be reached. The current requirement is very low at around 10 nA and 100 nA in sleep mode. This means a battery lifespan of up to 15 years can be achieved.

In addition to the physical layer, LoRa/LoRaWAN defines two additional layers. Layer 2 is the LoRaWAN connection layer, which provides basic message integrity protection based on cyclic redundancy checks and enables basic point-to-point communication. The third layer adds the network protocol function, which is defined by LoRaWAN. The LoRaWAN protocol offers terminal devices the opportunity to send data to the Internet, in particular to a cloud application, or to receive data from it using a gateway (also called a concentrator or base station).

There are different variants for the terminal devices. Class A includes communication using the ALOHA access method. With this method, the device sends its generated data packets to the gateway, followed by two download receive windows that can be used to receive data. A new data transfer can only be initiated by the terminal device during a new upload. Class B terminal devices, on the other hand, open download receive windows at specified times. To do this, the terminal device receives a time-controlled beacon signal from the gateway. This means that a network server knows when the terminal device is ready to receive data. Class C terminal devices have a permanently open download receive window and are therefore permanently active, but also have increased power consumption.

LoRaWAN uses a star network architecture in which all terminal devices communicate via the most suitable gateway. These gateways take care of routing and, if more than one gateway is within range of a terminal device and the local network is overloaded, they can also redirect communication to an alternative.

However, some other IoT protocols (e.g. ZigBee or Z-Wave) use so-called mesh network architectures to increase the maximum distance of a terminal device from a gateway. The terminal devices in the mesh network forward the messages to each other until they reach a gateway, which transfers the messages to the Internet. Mesh networks program themselves and dynamically adapt to environmental conditions without the need for a master controller or hierarchy. However, in order to be able to forward messages, the terminal devices of a mesh network must be ready to receive either constantly or at regular intervals and cannot be put into sleep mode for long periods of time. The result is a higher energy requirement for the terminal devices to forward messages to and from the gateways and a resulting shortening of battery life.

The star network architecture of LoRaWAN, on the other hand, allows the terminal devices (particularly classes A and B) to go into the energy-saving idle state for long periods of time, thereby ensuring that the terminal device battery is put under as little strain as possible and can therefore be operated for several years without having to change the battery. The gateway acts as a bridge between simple protocols optimized for battery life (LoRa/LoRaWAN), which are better suited for resource-limited devices, and the Internet Protocol (IP), which is used to provide IoT services and applications. After the gateway has received the data packets from the terminal device via LoRa/LoRaWAN, it sends them via the Internet Protocol (IP) to a network server, which in turn has interfaces to IoT platforms and applications.

However, existing LoRaWAN networks also have undesirable limitations. One such limitation is in particular the use of the standard IP protocol between the gateway and the network server. Especially when used in rural areas where mobile network coverage (3G, 4G/LTE or even 5G) is sparse or non-existent and a wired Internet connection would be too expensive, a gateway often cannot be operated due to a lack of an Internet connection. LoRa networks can therefore only be used where the maximum radio range between the gateway connected to the Internet and the terminal devices is not exceeded. Due to the star network architecture, the range of a LoRaWAN network is therefore limited to the maximum range of the single-hop radio connection between the gateway and the terminal device. This restriction particularly affects remote, rural areas where there is neither a wired Internet connection nor suitable mobile network coverage (5G, 4G/LTE, 3G).

It is already known that the range of wireless networks can be increased by meshing the terminal devices and thus the range limitation of a single radio connection can be lifted. In these so-called meshed multi-hop networks, the terminal devices communicate with each other and forward the data to each other without any special hierarchy until a terminal device can finally hand over the data to a gateway.

The implementation of such a meshed multi-hop wireless network in the terminal devices solves the problem of range limitation from the gateway to the terminal device by forwarding the data packets from one terminal device to another terminal device, but is not compatible with the LoRaWAN specification because special terminal devices with an additional meshing function are used here. Since standard LoRaWAN devices can only contact a gateway directly and are not able to communicate directly with other devices, standard LoRaWAN devices cannot operate with this range extension. The range extension by implementing a meshed multi-hop wireless network in the terminal devices is therefore not compatible with the LoRaWAN network standard.

An example of this is the development platform for LoRa terminal devices from PyCom (LoPy4 and FiPy), with which a multi-hop wireless network can be implemented in the LoRa terminal devices, analogous to ZigBee or Z-Wave. Although this development platform can solve the problem of range limitation from the terminal device to the gateway by forwarding the data packets from one terminal device to another terminal device, it is not compatible with the LoRaWAN specification because the mesh function only works between terminal devices that are based on LoPy4 or FiPy. Existing LoRaWAN terminal devices cannot benefit from this range extension, as they can contact a gateway only directly and are not able to communicate with the gateway indirectly via other terminal devices.

One approach to implementing a mesh network architecture in the area of WiFi is the 802.11s standard, which defines a deterministic access method for WLAN networks that uses time periods instead of competing access to the shared medium. To find a route between nodes, 802.11s does not use an IP routing protocol, but rather the MAC layer in order to take the specific and changing characteristics of the radio connection into account. A hybrid wireless mesh protocol developed specifically for mesh is usually used here. The 802.11s standard requires the installation of dozens of access points that are only connected to one another via radio. The rule here is forwarding via multiple access points, also known as multi-hop. In extreme cases, only one of these needs to be connected to a LAN or WAN. Each node can perform one, two or three different network functions: Mesh points pass data on to the next node, mesh access points exchange data with terminal devices and mesh point portals form the gateways to the wired network world. For the terminal devices, the mesh network appears like a simple WLAN. Since the 802.11s standard is defined for WLAN network architectures, it is not directly possible to apply this standard to LoRaWAN networks, which in turn are based on the LoRa radio standard.

An advantageous solution to increase the range limitation of LoRaWAN networks without having to accept incompatibility with existing LoRaWAN terminal devices is to implement mesh functionality in the gateways. If LoRaWAN networks are expanded with mesh gateways, greater range or area coverage in areas without access to the Internet can be achieved with a LoRaWAN network. All that is required is individual gateways that are connected to the network server using an IP protocol. Since the communication protocol between gateways and terminal devices can remain unchanged, this approach maintains compatibility with existing LoRaWAN terminal devices and does not require the terminal devices to be adapted to the mesh functionality. However, an unlimited network is not possible here either, since according to the LoRaWAN protocol, class A terminal devices have only two receive windows and therefore the period of time in which they expect a response is limited. If this time is exceeded, a timeout error occurs and communication with at least one terminal device breaks down. The maximum size of such a LoRaWAN mesh gateway network is limited to a few hops due to the extension of the transit time. Systems for detecting and locating forest fires are known. For this purpose, the area to be monitored is monitored using optical sensors that can detect the columns of smoke produced by a forest fire. These sensors are, for example, rotatable cameras, which, however, have the disadvantage that they are less effective at night and are susceptible to false detections, for example in the case of dust clouds as a result of agricultural activities. In addition, optical systems can usually only detect the forest fire when the forest fire is already advanced and the smoke columns become visible over greater distances. Monitoring from a high orbit using an IR camera installed in a satellite has the disadvantage that the resolution of the cameras over large distances prevents forest fires from being detected in the early phase. A satellite is also expensive to purchase and maintain, especially launching the satellite. Monitoring using mini-satellites in a low orbit has the disadvantage that the satellites are not geostationary, so they require a certain amount of time to complete an orbit during which the area is not monitored. Close monitoring requires a large number of satellites, which are also expensive to launch. Monitoring by satellites is also associated with high carbon dioxide emissions during their launches.

It makes more sense to monitor the area using a number of inexpensive, mass-produced sensors that work using optical smoke detection and/or gas detection. The sensors are distributed throughout the area and deliver data to a base station via radio connection.

Such a system for locating forest fires is presented in US 2008/0309502 A1. In the event of a fire alarm, a sensor delivers information to a nearby control terminal, which then triggers an alarm using a long-range radio frequency signal.

This system has the disadvantage that the control terminal triggers the alarm and must have a powerful RF unit to do this. The sensors require a GPS unit that constantly sends a signal to the control terminal. The power consumption of the sensors is therefore high and the service life of the sensors' energy sources (batteries) is limited. The system is also unable to record the direction and speed of spread of the forest fire.

It is therefore the aim of the present invention to provide a method for locating a forest fire that works reliably, can be expanded as desired, is inexpensive to install and maintain, and enables the direction and speed of spread of a forest fire to be recorded.

It is also an aim of the present invention to provide a LoRaWAN mesh gateway network that works reliably, can be expanded as desired, is inexpensive to install and maintain, and enables the direction and speed of spread of a forest fire to be recorded.

The stated aim is achieved using the method for locating a forest fire according to claim 1. Advantageous embodiments of the invention are set out in the dependent claims. The method according to the invention for locating a forest fire has five method steps: In the first method step, a first signal from a source is detected with a first sensor unit. In the second method step, the time of detection of the first signal is recorded. In the third method step, a second signal from a source is detected with a second sensor unit. In the fourth method step, the time of detection of the second signal is recorded. In the fifth method step, a position is determined from the detected signals and the recorded times of detection of the detected signals.

Based on these two detected signals and the recorded times of their detection, the position of the source of the signals is determined. In addition, a local change can be determined due to the temporal differences and different positions of the first sensor unit and the second sensor unit. To determine the position of the source, the transit time of the signals is taken into account.

In a further development of the method according to the invention, a third signal from a source is detected with a third sensor unit and the time of detection of the third signal is recorded. Based on these three detected signals and the recorded times of their detection, the position of the source of the signals is determined. In addition, due to the temporal differences and different positions of the first, second and third sensor units, a local change can be determined that is more precise than determining the position of the source of the signals with only two detected signals.

In a further embodiment of the invention, the detection of the first signal, the second signal and/or the third signal takes place within a time interval of max. 60 s, preferably max. 30 s and particularly preferably max. 10 s. The signals are detected within such a short time interval that the local change in the source of the signals is recorded with a sufficiently high temporal resolution.

In a further embodiment of the invention, the signals come from the same source. In particular, the source is a forest fire, the position and change in position of which are recorded over time.

In a further embodiment of the invention, the position of the source is determined. In particular, the source is a forest fire, the position and change in position of which is recorded over time.

In a further development of the invention, the signals include gases. In addition to heavy smoke, a forest fire produces a variety of gases, particularly carbon dioxide and carbon monoxide. The type and concentration of these gases are characteristic of a forest fire and can be detected using suitable sensors.

In a further embodiment of the invention, the signals recorded by the sensor units are analyzed with regard to the concentration of the composition of the gases. The characteristic gases that occur in a forest fire are analyzed. If a concentration of the gases is exceeded, a forest fire is detected.

In a further development of the invention, the signals recorded by the sensor units are analyzed with regard to the temperature of the gases. In addition to the type and concentration of the gases produced in a forest fire, their temperature is an indicator of a forest fire.

In a further embodiment of the invention, the emergence and/or presence of a forest fire is concluded from the analyzed concentrations of the composition of the gases and/or from the analyzed temperatures. The type, composition and temperature of the gases produced in a forest fire also indicate the occurrence of a forest fire. This makes it possible to detect an emerging forest fire and to combat it at an early stage.

In a further embodiment of the invention, the position of the source is determined from the transit time of the signals. Signals from the same source can have different time stamps, i.e. be detected at different times. The difference in the detection of the signals is used to determine the position of the source.

In a further embodiment of the invention, the wind direction of a prevailing wind is determined. The prevailing wind direction is an important indicator of the future position of the source of the signals, especially a forest fire. The wind direction can be measured using a sensor on the terminal device or made available as information via the network.

In a further development of the invention, the wind speed of a prevailing wind is determined. Wind direction and speed provide firefighting forces with information about the direction and speed of spread of the forest fire. Firefighters can therefore be deployed in a targeted and prioritized manner. The wind direction can be measured using a sensor on the terminal device or made available as information via the network.

In a further embodiment of the invention, the wind direction and/or the wind speed is/are taken into account when determining the position of the source of the detected signals. Not only the direction and speed of the spread of the forest fire, but also its position, especially the position where it started, can be determined by taking wind direction and speed into account.

In a further embodiment of the invention, the signals come from different sources. In addition to gases that characterize a forest fire, signals from other sources can also be detected. Examples include signals from additional sensor units that provide additional information, such as wind direction and speed, locating devices for detecting the position of the sensor unit detecting the signals. The signals from the other sources are used, for example, to improve the position determination of the source of the signals.

In a further development of the invention, the detected signals are recorded by the same sensor unit. For this purpose, the sensor unit can have a plurality of sensors, each of which can detect different signals, for example gas sensors, temperature sensors, time sensors and/or position sensors.

In a further embodiment of the invention, the detected signals are path parameters and/or time signals of a locating device. To carry out the method according to the invention, it is necessary to determine the position of the terminal unit or the sensor unit. A navigation satellite system can be used for this purpose, e.g. GPS. Such a system enables the position of the sensor unit to be determined with an accuracy of a few meters. At the same time, such a position determination is known and can be carried out quickly and easily.

In a further development of the invention, the position of the locating device is determined. A navigation satellite system is based on determining the position of multiple—at least four—satellites. The position of the sensor unit is determined from the position of the satellites and the time of their position.

The aim is further achieved using a LoRaWAN mesh gateway network according to the invention. Advantageous embodiments of the invention are set out in the dependent claims.

The LoRaWAN mesh gateway network according to the invention has several terminal devices, several gateways and a network server. A terminal device has a sensor unit, a logic unit, a communication unit and a timekeeper. The logic unit is intended and suitable for evaluating the signals recorded by the sensor unit and the time recorded by the timekeeper. The logic unit is, for example, a microcomputer and has a memory and microprocessor as well as suitable software.

The LoRaWAN network has a star-shaped architecture in which message packets are exchanged between the terminal devices and a central Internet network server using gateways. The LoRaWAN mesh gateway network has a variety of sensors connected to gateways via a single-hop connection.

In a further development of the invention, the sensor unit is intended and suitable for recording signals from the gases from which the gases can be analyzed. In addition to heavy smoke, a forest fire produces a variety of gases, particularly carbon dioxide and carbon monoxide. The type and concentration of these gases are characteristic of a forest fire and can be detected using suitable sensors.

In a further embodiment of the invention, the sensor unit is intended and suitable for analyzing the signals of the gases with regard to the concentration and composition of the gases. The type and concentration of these gases are characteristic of a forest fire and can be detected using suitable sensors. The characteristic gases that occur in a forest fire are analyzed. If a concentration of the gases is exceeded, a forest fire is detected.

In a further embodiment of the invention, the sensor unit is intended and suitable for analyzing the signals of the gases with regard to their temperature. In addition to the type and concentration of the gases produced in a forest fire, their temperature is an indicator of a forest fire.

In a further embodiment of the invention, the sensor unit is intended and suitable for recording signals from which the wind direction of a prevailing wind can be determined. The prevailing wind direction is an important indicator of the future position of the source of the signals, especially a forest fire.

In a further embodiment of the invention, the sensor unit is intended and suitable for recording signals from which the wind speed of a prevailing wind can be determined. Wind direction and speed provide firefighting forces with information about the direction and speed of spread of the forest fire. Firefighters can therefore be deployed in a targeted and prioritized manner.

In a further development of the invention, the sensor unit has different sensors. For this purpose, the sensor unit can have a plurality of sensors, each of which can detect different signals, for example gas sensors, temperature sensors, time sensors and/or position sensors.

Figure 1B:
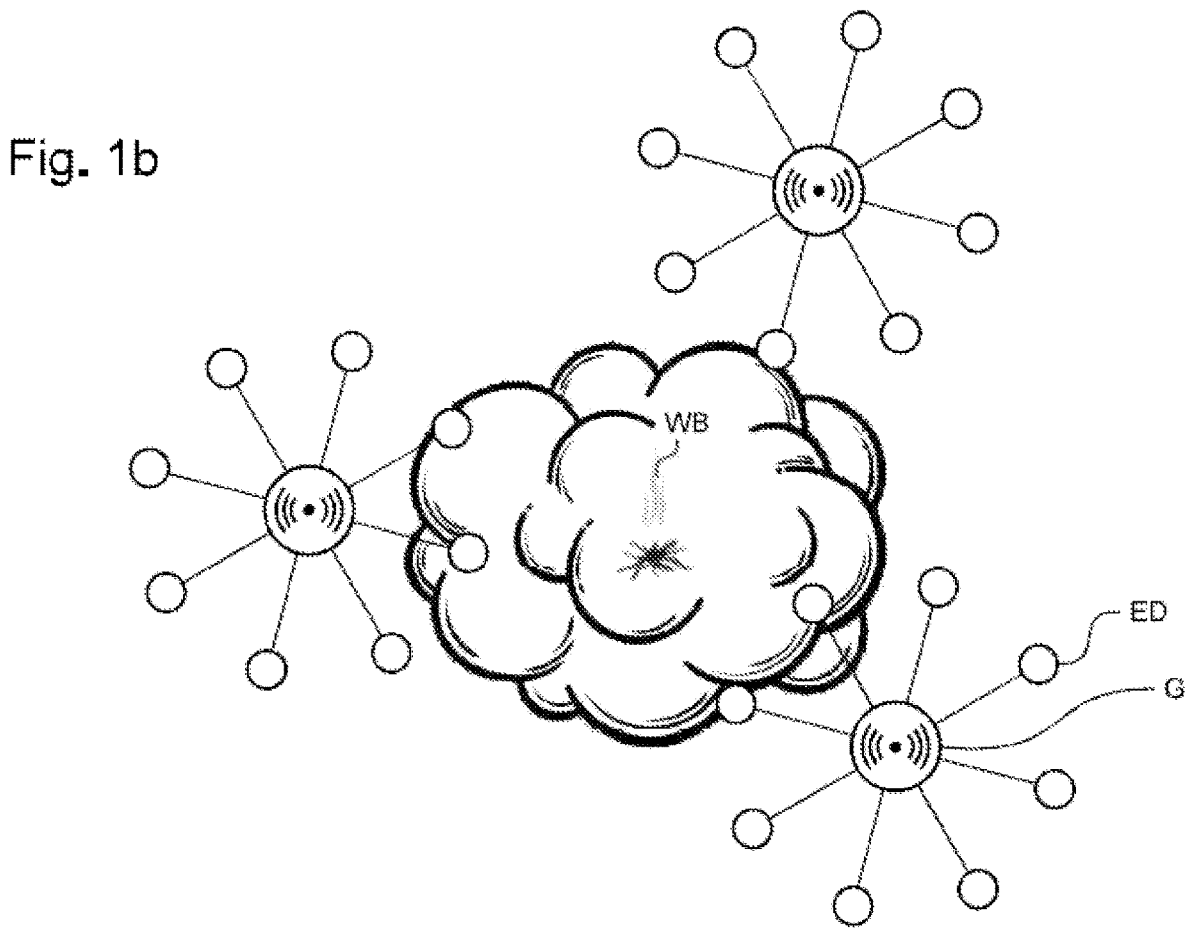

Exemplary embodiments of the method for locating a forest fire according to the invention and of the LoRaWAN mesh gateway network according to the invention are shown schematically in simplified form in the drawings and are explained in more detail in the following description. Wherein:

FIG. 1 *a* Method for locating a forest fire at time t1

FIG. 1 *b* Method for locating a forest fire at time t2

Figure 2:
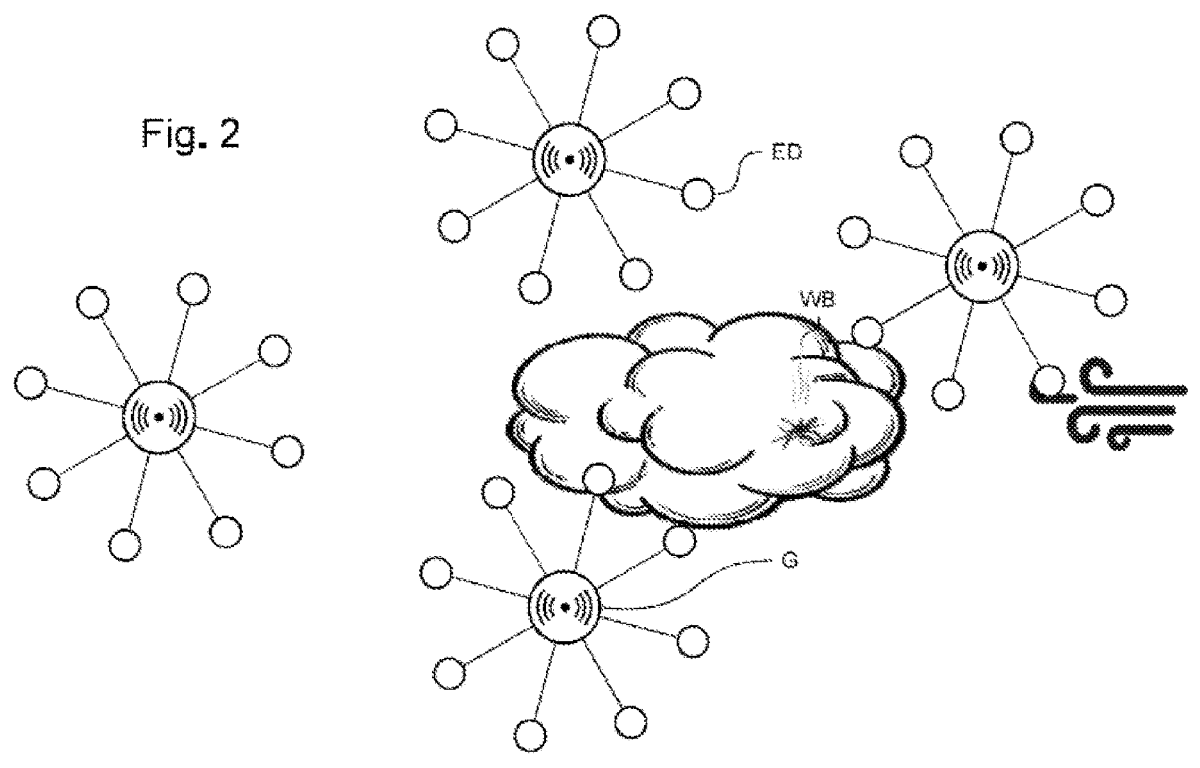

FIG. 2 Method for locating a forest fire, including the wind direction

Figure 3:
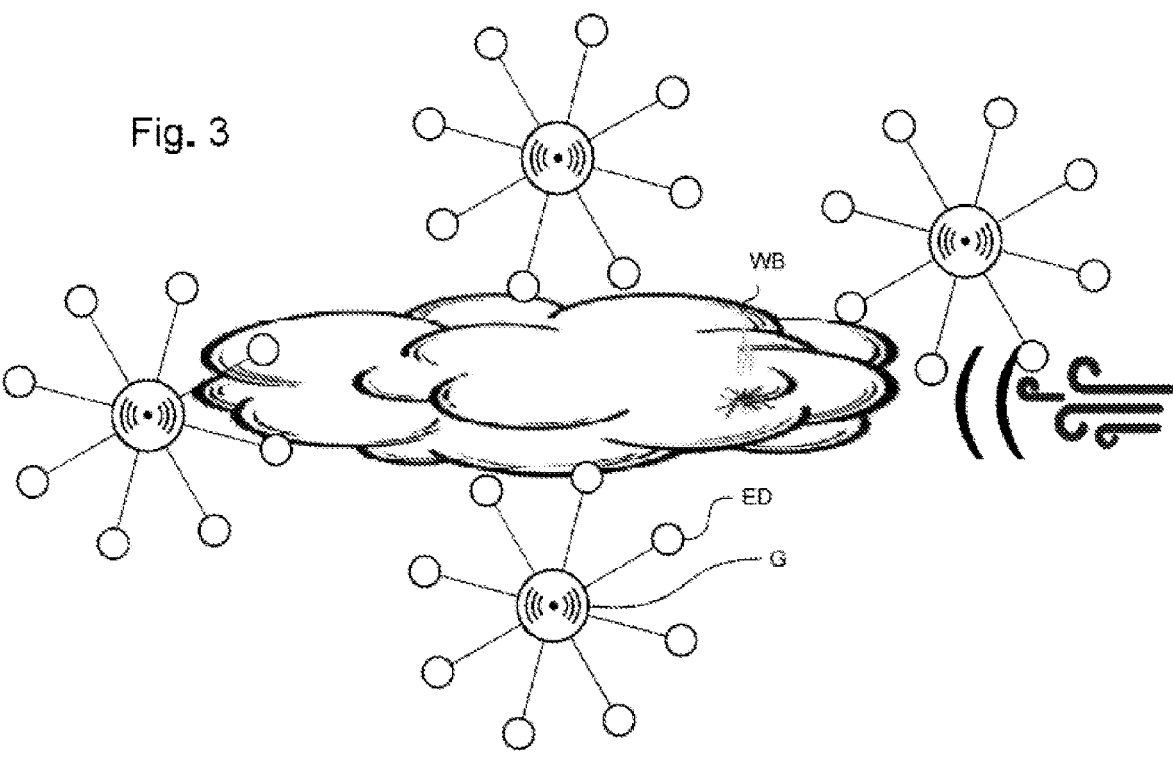
Figures 4A, 4B, 4C:
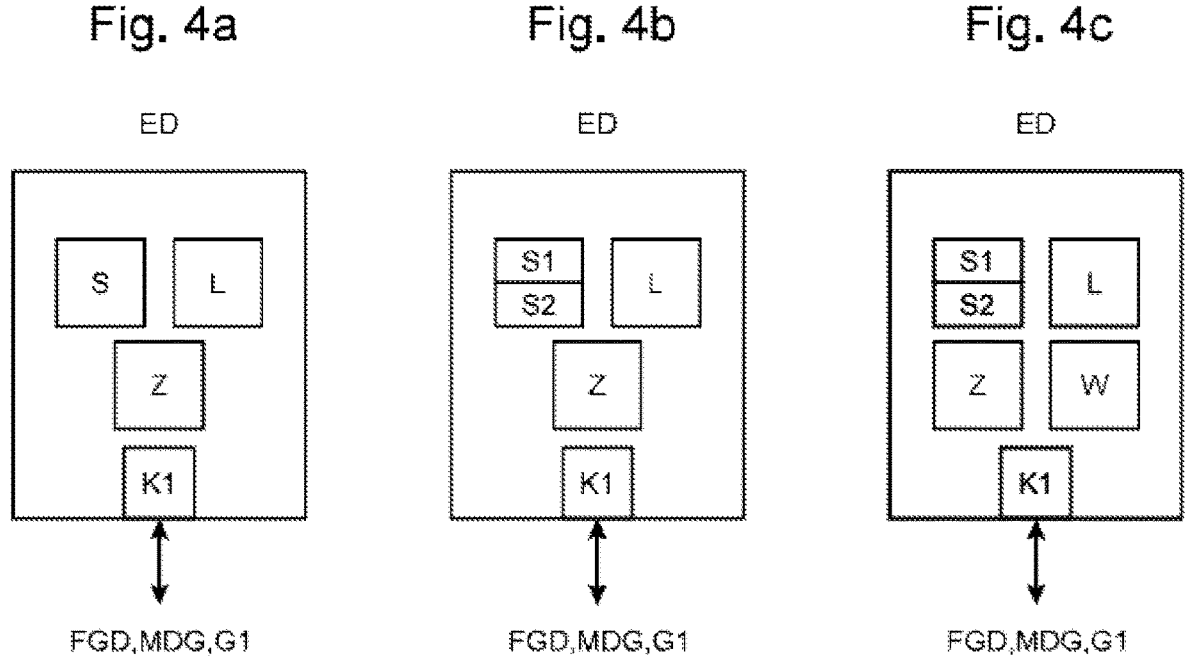
Figure 5:
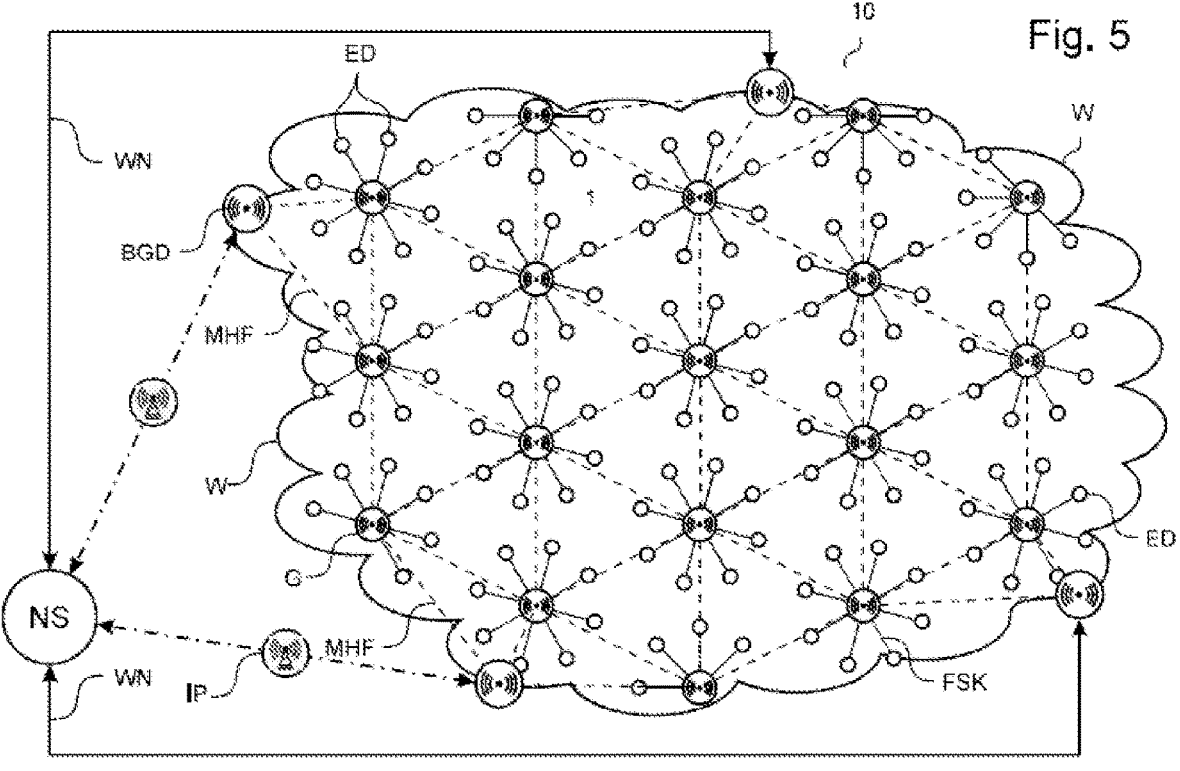
Figure 6:
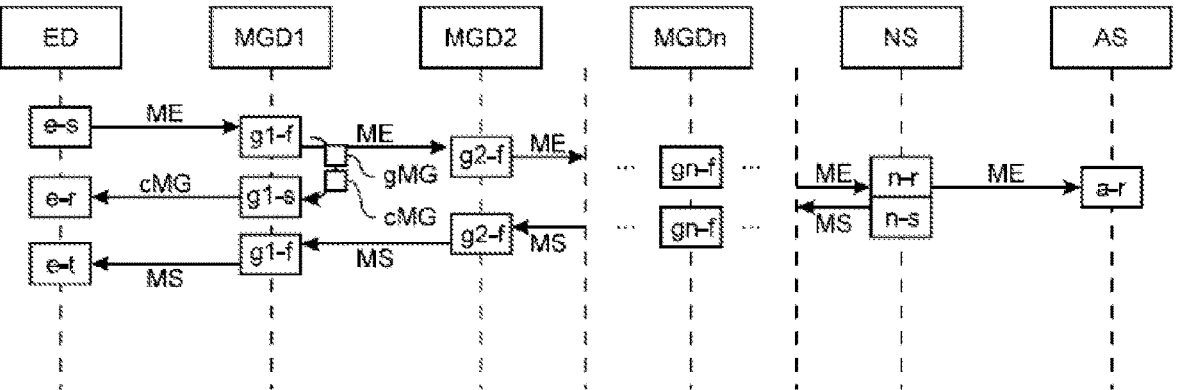
Figure 7:
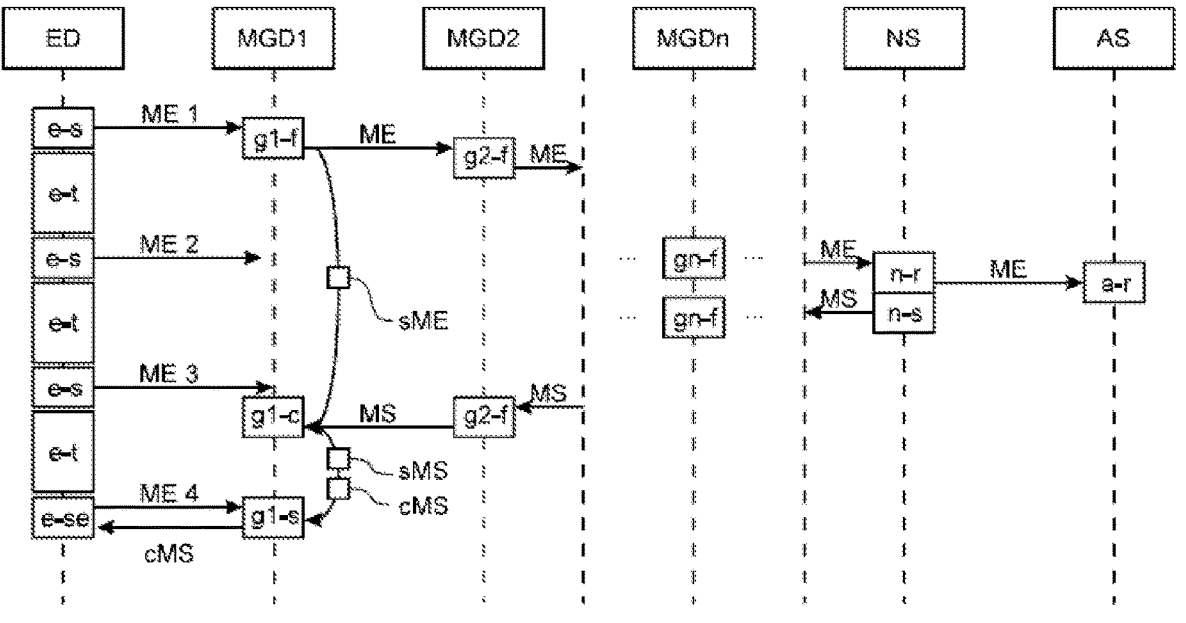

FIG. 3 Method for locating a forest fire, including the wind direction and the wind strength FIG. 4 *a-c* Embodiments of the terminal device FIG. 5 Structure of the LoRaWAN mesh gateway network according to the invention, used to locate a forest fire FIG. 6 Communication process for a solution for the time-out error FIG. 7 Communication process in an extensive LoRaWAN mesh gateway network FIG. 1 shows the inventive method for locating a forest fire at two different times t1 (FIG. 1 *a*) and t2 (FIG. 1 *b*), where t2>t1 is. Only a part of the forest fire early detection system 10 is shown in this and the following figures (FIGS. 1 to 3) (see FIG. 5). The forest fire early detection system 10 has a plurality of terminal devices ED, eight terminal devices ED are each connected to a gateway G via a single-hop connection using FSK modulation FSK. At time t1 (FIG. 1 $a$), two terminal devices ED simultaneously detect a forest fire. A single terminal device ED has a sensor unit S to detect a forest fire (see FIG. 4), which has sensors for gas analysis (composition and concentration of gases) as well as for detecting the temperature of the gases.

When carrying out the method according to the invention for locating a forest fire, the position of each individual terminal device ED must be determined as precisely as possible. The position can be determined, for example, when installing the terminal device ED. The terminal device ED can, for example, be arranged on a tree in the forest to be monitored and the position of the terminal device ED can be determined once using a navigation system, for example a satellite navigation system, for example GPS (Global Positioning System). For this purpose, signals from sources (here the satellites) are detected and the time of their detection is recorded. The signals themselves contain a time stamp, so that the position of the terminal device is determined from the transit time of several signals. For example, a commercially available GPS system or a smartphone can be used for this purpose.

It is also possible to determine the position of a terminal device ED by a suitable receiver, in particular by the sensor unit S arranged in the terminal device ED. The sensor unit S of a terminal device ED receives signals from at least four, usually six sources, in the case of using the navigation satellite system GPS radio signals at the L1 frequency (1575.42 MHZ), to determine the position. The sources are satellites that constantly broadcast their current position and the exact time. The determined position of a terminal device ED is also stored permanently, for example, on the network server NS (see FIG. 5). Alternatively or additionally, the position determination of a terminal device ED can be determined constantly or at intervals by means of the navigation satellite system by the sensor unit S arranged in the terminal device ED. The position of a terminal device ED is then checked and updated.

The sensor unit S of the first terminal device ED detects a first signal, the source being the forest fire and the signals being the gases generated by the forest fire. The sensor unit S of the first terminal device ED also records the time, in particular the time t1, of the detection of the first signal. In the same way, the sensor unit S of the second terminal device ED detects a second signal, the source also being the forest fire and the signals being the gases generated by the forest fire. Likewise, the sensor unit S of the second terminal device ED records the time, in particular the time t1, of the detection of the second signal. The detection of the first signal and the second signal takes place within a time interval of max. 60 s, preferably max. 30 s and particularly preferably max. 10 s. Based on these two detected signals and the recorded times t1 of their detection, the position of the source is determined, at this time t1 a position between the two terminal devices ED. The position of the source or forest fire is determined taking into account the transit time of the signals, i.e. the speed of propagation of the gases.

At the later time t2 (FIG. 1 $b$), five terminal devices ED simultaneously detect the forest fire. The sensor units S of the terminal devices ED each detect a signal, the source of which is the forest fire and the signals from the gases generated by the forest fire, as well as the individual times t2 of the detection of the five individual signals. Based on these five detected signals and the recorded times t2 of their detection, the position of the source is determined, also a position between the five terminal devices ED. At this time t2, the location of the forest fire is more accurate due to the overdetermination using five terminal devices ED than at time t1, at which the location is determined using only two terminal devices ED. Due to the knowledge of the times t1, t2 of the detection of the signals from the terminal devices ED, it is not only possible to determine the position of a forest fire more precisely, but also the speed of its spread. In addition, the direction of spread of the forest fire can be determined if the number and location of the terminal devices ED detecting the forest fire as well as the times of the respective detection are known.

The method according to the invention for locating a forest fire, taking into account the wind direction, is shown in FIG. 2. Three terminal devices ED simultaneously detect a forest fire. A single terminal device ED has a sensor unit S to detect a forest fire (see FIG. FIG. 4), which has sensors for gas analysis, for detecting the temperature of the gases and for detecting the prevailing wind direction. Alternatively or additionally, the sensor unit S can also record or receive signals about the prevailing wind direction from external measuring devices.

The sensor units S of the terminal devices ED each detect a signal, the source of which is the forest fire and the signals from the gases generated by the forest fire, as well as the individual times of the recording of the three individual signals. Based on these three detected signals and the recorded times of their detection, the position of the source is determined, also a position between the three terminal devices ED, taking into account the transit time of the signals. The transit time of the individual signals also depends on the wind direction, which is also included in the calculation of the position.

FIG. 3 shows the method for locating a forest fire according to the invention, taking into account the wind direction and the wind speed. Several terminal devices ED detect a forest fire at the same time. A single terminal device ED has a sensor unit S to detect a forest fire (see FIG. 4), the sensors for gas analysis, to detect the temperature of the gases and to detect the prevailing wind direction and wind speed. The sensor unit S has received or itself recorded the signals regarding the prevailing wind direction and speed from external measuring devices. The sensor units S of the terminal devices ED each detect a signal, the source of which is the gases generated by the forest fire, as well as the individual times of the detection of the five individual signals. Based on these two detected signals and the recorded times of their detection, the position of the source is determined.

FIG. 4 shows exemplary embodiments of the terminal device ED. In order to be able to install and operate the terminal device ED even in inhospitable and especially rural areas far away from energy supplies, the terminal device ED is equipped with a self-sufficient energy supply E. In the simplest case, the energy supply E is a battery, which can also be designed to be rechargeable. It is also possible to use capacitors, such as supercapacitors. The use of solar cells is somewhat more complex and cost-intensive, but offers a very long service life for the terminal device ED. In addition, a terminal device ED comprises the actual sensor unit S, which has sensors for gas analysis (composition and concentration of gases) as well as for detecting the temperature of the gases. For this purpose, the sensor unit S can be designed in two stages (FIG. 4 $b$, $c$).

The timekeeper Z is, for example, a quartz clock or a receiver that can receive time signals from an external source. To record the wind speed and the wind direction, a wind measuring device S2 is arranged in the terminal device ED (FIG. 4 $c$). The logic unit L is a microcomputer and has a memory and a microprocessor. Using suitable software, the logic unit L is able to evaluate the signals recorded by the sensor unit S and the time recorded by the timekeeper Z.

The terminal device ED additionally has the communication interface K1. Using the communication interface K1, messages from the terminal device ED, in particular measurement data, are sent as a data packet wirelessly using a single-hop connection FSK via LoRa (chirp frequency spread modulation) or frequency modulation to a gateway G1, FGD, MDG. All components mentioned are arranged in a housing to protect against the effects of the weather.

An exemplary embodiment of a mesh gateway network 1 according to the invention for locating a forest fire is shown in FIG. 5. The forest fire early detection system 10 has a mesh gateway network 1 that uses the technology of a LoRaWAN network. The LoRaWAN network has a star-shaped architecture in which message packets are exchanged between the sensors ED and a central Internet network server using gateways. The forest fire early detection system 10 has a plurality of sensors ED, which are connected to gateways G via a single-hop connection FSK. The gateways G1 are usually front-end gateways FGD. The front-end gateways FGD are connected to each other and partly to border gateways G2. A border gateway G2 can also be combined with a front-end gateway FGD to form a mesh gateway device MDG in one device. The border gateways G2 are connected to the Internet network server NS, either via a wired connection WN or via a wireless connection using the Internet protocol IP.

The front-end gateways FGD and the border gateways G2 are connected to one another via a meshed multi-hop network MHF, so that a front-end gateway FGD does not require a direct connection to the Internet network server NS. This achieves an extension of the range of LoRaWAN networks by interposing a multi-hop network using FGD front-end gateways, thus achieving full compatibility with the LoRaWAN specification.

The mesh gateways MGDn communicate with each other using the multi-hop wireless network MHF and at least one mesh gateway MGD is connected to the network server NS via the standard Internet protocol IP. A mesh gateway MGDn has an ACK signal generation unit and, after receiving a message from a terminal device EDn, sends an ACK signal ACK to the terminal device EDn that sent the message. This ensures that a message from the terminal device EDn to a mesh gateway MGDn is correctly sent to the mesh gateway MGDn. The terminal device does not have to have a permanently active download receive window and therefore be permanently active, as with a class C terminal device, but can also be, for example, a class A or B terminal device in accordance with the LoRaWAN specification. The power consumption and the operating time of the EDn terminal device are thus increased. The failure of a terminal device EDn due to internal errors is avoided.

All mesh gateways MGDn additionally have a sub-server unit with a processor and storage unit, which is equipped with a program and/or operating system and/or firmware that is suitable for carrying out the functionalities intended for the network server NS according to the LoRaWAN protocol.

FIG. 6 shows a solution for the time-out error mentioned, in which a mesh gateway MGD1, MGD2, MGDn has a sub-server unit that takes over part of the functionality of a network server NS. In this exemplary embodiment, the terminal device ED in turn sends e-s a join request ME to the next mesh gateway MGD1. The mesh gateway MGD1 generates gMG and encrypts cMG a reply message and sends it back g1-s directly to the terminal device ED. The terminal device ED receives the response message cMG from the mesh gateway MGD1 within the receive window and remains in proper operation. Parallel to the generation gMG and encryption cMG of the response message cMG and its sending g1-s to the terminal device ED, the mesh gateway MGD1 forwards g1-f the request ME of the terminal device ED to the next mesh gateway MGD2. This ensures that a time-out error in the terminal device ED is avoided and that the request ME of the terminal device ED is forwarded g1-f, g2-f to the network server NS via the mesh gateways MGD1, MGD2, MGDn. According to the LoRaWAN protocol, the network server NS receives the request from the terminal device ED, forwards n-r the request to the application server AS and generates n-s a response message MS, which is sent via the forwarding g1-f, g2-f of the mesh gateways MGD1, MGD2, MGDn back to the terminal device ED.

FIG. 7 shows a preferred embodiment of the invention. Communication is shown here in an extensive LoRaWAN mesh gateway network, which has a plurality of terminal devices ED as well as mesh gateways MGD1, MGD2, MGDn. At least some mesh gateways MGD1, MGD2, MGDn have a sub-server unit that takes over functionalities of the network server NS.

A terminal device ED of the LoRaWAN mesh gateway network sends e-s a message ME1 with a check link request to the network server NS. The message ME1 from the terminal device ED is forwarded g1-f, g2-f, gn-f via a plurality of mesh gateways MGD1, MGD2, MGDn before the network server NS receives n-r the message ME1. The nearest mesh gateway MGD1 stores sME information about the sent message ME1 of the terminal device ED, with the help of which the mesh gateway MGD1 can identify the message ME1. The network server NS forwards the message ME1 to the application server AS and generates a response message MS, which the network server NS sends back n-s to the terminal device ED via the plurality of mesh gateways MGD1, MGD2, MGDn.

In the meantime, the receive windows are already closed according to the definition of the LoRaWAN protocol, the terminal device ED is put into time-out mode e-t, etc. After the time-out has expired, the terminal device ED again sends e-s a message ME2, which corresponds to the message ME1, to the network server NS. If the terminal device ED again does not receive a response message MS from the network server NS, the terminal again goes into time-out mode e-t until it can reset itself independently. In this exemplary embodiment, the terminal device attempts to send e-s the message ME1, ME2, ME3 three times, without a response message MS from the network server NS being able to be received by the terminal device ED within the respective receive window.

During the third time-out e-t, the response message MS from the network server NS reaches the gateway G1 closest to the terminal device ED. The sub-server unit SSE of the mesh gateway MGD1 checks the response message MS of the network server NS and assigns it to g1-c based on the information stored about the original message M1 of the terminal device ED to identify the message M1 of the original message ME1 of the terminal device ED and stores sMS and also encrypts cMS the response message MS from the network server NS. After resetting the terminal device ED after the third time-out e-t has elapsed, the terminal device ED sends the original message ME4 a fourth time e-se. The nearest mesh gateway MGD1 receives the message ME4, identifies it as identical to the original message ME1 and sends the response message MS received from the network server NS and stored on the mesh gateway MGD1 to the terminal device ED. The terminal receives e-se the response message MS from the network server NS and continues normal operation.

LIST OF REFERENCE SIGNS

1 LoRaWAN mesh gateway network
10 Forest fire early detection system
ED, EDn1 Terminal devices
G Gateway
NS Internet network server
IP Internet protocol
MHF Multi-hop wireless network
FGD, FGDn Front-end gateways
MDG, MDGn Mesh gateways
BGD1, BGDn Border gateway
FSK FSK modulation
WN Wired connection
S Sensor unit
S1, S2 Sensor
L Logic unit
Z Timekeeper
K1 Communication interface of the terminal device
W Forest
WB Forest fire
e-s Sending messages from the terminal device
e-r Receiving messages from the terminal device
e-t Time-out error on the terminal device
e-se Sending and receiving messages from the terminal device
gf, g1-f, g2-f, gn-f Forwarding messages from the gateway
g1-s Sending messages from the gateway
g1-c Checking messages from the gateway
n-r Receiving messages on the network server
n-s Sending messages from the network server
a-r Receiving messages on the application server
MG Gateway message
gMG Generating a gateway message
cMG Encrypting a gateway message
SME Storing a terminal device message
ME Terminal device message
MS, MS1, MS2,
MS3, MS4 Server message
CMS Encrypting a server message

The invention claimed is:
1. A method for locating a forest fire having the method steps of
   detecting a first signal from a source with a first sensor unit of a first terminal device,
   recording the time of detection of the first signal,
   detecting a second signal from a source with a second sensor unit of a second terminal device
   recording the time of detection of the second signal, and
   determining a position from the detected signals and the recorded times of detection of the detected signals, wherein the first and the second sensor unit have different positions, wherein the first sensor unit is part of a terminal device of a LoRaWAN with several terminal devices, several gateways, wherein the position of the terminal device has been determined when installing the terminal device.
   2. The method for locating a forest fire according to claim 1, characterized in that
      a third signal from a source is detected with a third sensor unit(S) and the time of detection of the third signal is recorded,
      wherein the position is determined from the three detected signals at the times of their detection.
   3. The method for locating a forest fire according to claim 1, characterized in that
      the detection of the first signal, of the second signal and/or of the third signal takes place within a time interval of max 60 s, preferably max 30 s and particularly preferably max 10 s.
   4. The method for locating a forest fire according to claim 1, characterized in that
      the signals come from the same source.
   5. The method for locating a forest fire according to claim 1, characterized in that
      the position of the source is determined.
   6. The method for locating a forest fire according to claim 1, characterized in that
      the signals include gases.
   7. The method for locating a forest fire according to claim 6, characterized in that
      the signals recorded by the sensor units(S) are analyzed with regard to the concentration of the composition of the gases.
   8. The method for locating a forest fire according to claim 6, characterized in that
      the signals recorded by the sensor units(S) are analyzed with regard to the temperature of the gases.
   9. The method for locating a forest fire according to claim 6, characterized in that
      the emergence and/or presence of a forest fire is concluded from the analyzed concentrations of the composition of the gases and/or from the analyzed temperatures.
   10. The method for locating a forest fire according to claim 1, characterized in that
      the position of the source is determined from the transit time of the signals.
   11. The method for locating a forest fire according to claim 1, characterized in that
      the wind direction of a prevailing wind is determined.
   12. The method for locating a forest fire according to claim 1, characterized in that
      the wind speed of a prevailing wind is determined.
   13. The method for locating a forest fire according to claim 1, characterized in that,
      when determining the position of the source of the detected signals, the wind direction and/or the wind speed is/are taken into account.

* * * * *